United States Patent [19]

Black

[11] Patent Number: 4,706,278
[45] Date of Patent: Nov. 10, 1987

[54] INTERFACE CIRCUIT FOR TRANSMITTING KEYCODES TO A CENTREX

[75] Inventor: James B. Black, Phoenix, Ariz.

[73] Assignee: GTE Communication Systems, Phoenix, Ariz.

[21] Appl. No.: 813,188

[22] Filed: Dec. 24, 1985

[51] Int. Cl.[4] .............................................. H04M 3/42
[52] U.S. Cl. .................................... 379/242; 379/229; 379/267
[58] Field of Search .............. 379/229, 230, 231, 232, 379/233, 234, 220, 201, 207, 225, 261, 262, 263, 264, 265, 266, 267, 355, 242

[56] References Cited

U.S. PATENT DOCUMENTS 4,254,304 3/1981 Fulghum et al. ............... 379/355 X

Primary Examiner—James L. Dwyer
Attorney, Agent, or Firm—Anthony Miologos; Peter Xiahros

[57] ABSTRACT

An interface circuit for transmitting data messages between a remotely located attendant console and a CENTREX equipped central office exchange. The interface circuit includes control and sense decoders connected to control and sense fields. Receiving circuit connected to the attendant console receive data messages transmitted from the attendant console. A controller connected to the receiving circuit process the received data messages, storing the data messages in a temporary memory. Sequential memory connected to the temporary memory receive and store in sequential order the data messages after they are processed. The sequential memory further includes memory enabling circuit connected to the control and sense decoder. In response to the controller signaling the CENTREX that data messages have been loaded in the sequential memory, the CENTREX sends an enabling signal to the memory enabling circuit transferring the data messages out of the sequential memory in a first in first out order to the CENTREX via the control and sense decoder and the sense field.

14 Claims, 6 Drawing Figures

INTERFACE CIRCUIT FOR TRANSMITTING KEYCODES TO A CENTREX

CROSS-REFERENCE TO RELATED APPLICATIONS

The present application is related to the following co-pending U.S. patent applications all having the same inventive entity and being assigned to the same assignee:

Ser. No. 813,322, titled, "A CENTREX ATTENDANT CONSOLE INTERFACE;"

Ser. No. 813,187, titled, "AN INTERFACE CIRCUIT FOR TRANSMITTING COMMAND CODES TO AN ATTENDANT CONSOLE;"

Ser. No. 813,321, titled, "CONTROL CIRCUIT FOR A CENTREX ATTENDANT CONSOLE INTERFACE;"

Ser. No. 813,186, titled, "AN ARRANGEMENT FOR TRANSFERRING DATA TO A CENTREX;"

Ser. No. 813,185, titled, "AN ARRANGEMENT FOR TRANSFERRING DATA TO AN ATTENDANT CONSOLE;"

Ser. No. 813,176, titled, "AN ARRANGEMENT FOR INITIALIZING A CENTREX CONSOLE INTERFACE CIRCUIT."

BACKGROUND OF THE INVENTION

The present invention relates in general to telecommunication switching systems and more particularly to an interface linking voice and data communications between a CENTREX equipped central office exchange and an attendant console.

Private Branch Exchanges (PBX) are telecommunication systems which provide communication services to customers having a plurality a subscriber instruments. The PBX equipment provides a host of enhanced features such as call forwarding, intercom functions, least cost routing of calls and detailed billing. Normally the PBX is purchased by the customer and installed on premises at his location. Therefore, since the PBX handles a first level of switching among the subscriber instruments fewer central office lines are required and therefore access charges are lower. However, this savings is offset by the initial cost of the PBX equipment.

An alternative to the classical PBX is being offered in the Telecommunication market today which provides all of the features of a PBX without any of the initial costs. This system known in the field as CENTREX (central exchange) allows either a portion of a central office network switching system or a dedicated CENTREX central office network switching system to function and provide the services and features as would a dedicated PBX. The customers subscriber instruments are connected directly to the CO switch or concentrated with a multiplexing device and connected via trunk lines. The telephone operating company providing the service would service the switch therefore, alleviating the customer of maintaining his own equipment. Of course access charges are somewhat higher with the CENTREX than those with the on premises PBX equipment.

Usually PBX equipment includes an attendant console which monitors the PBX, i.e. lines or trunks in use, and provide a means of selecting or deselecting features and services as well as a system status display. Additionally, the console can also serve as a central operator station providing for attendant call handling. Such consoles are also used with CENTREX systems to provide the features discussed above.

It therefore becomes the object of the present invention to provide a console interface circuit to link an attendant console normally located at the customer premises with a CENTREX network system located at a telephone operating companies central office.

SUMMARY OF THE INVENTION

In order to accomplish the object of the present invention there is provided an interface circuit for transmitting data messages between a remotely located attendant console and CENTREX equipped central office exchange. The central office exchange includes an analog control unit connected to a peripheral processor. The analog control unit includes a control field for sending control signals to the interface circuit and a sense field for receiving control signals and data messages from the interface circuit.

The interface circuit of the present invention comprises control and sense decoding means connected to the control and sense fields. The control and sense decoding means is arranged to output control signals to the interface circuit in response to control commands sent over the control field and output control signals and data messages over the sense field.

A receiving means connected to the attendant console is arranged to receive data messages from the attendant console. Controller means connected to the receiving means, process the received data messages storing the data messages in a temporary memory. The controller means is further connected to the control and sense decoding means and outputs control signals to the peripheral processor.

A sequential memory means connected to the temporary memory is disposed to receive and store in sequential order the data messages as they are received. The sequential memory means further includes memory enabling means connected to the control and sense decoding means.

Responsive to the controller means signaling the peripheral processor that data messages have been loaded in the sequential memory means, the peripheral processor sends an enabling signal to the memory enabling means. The enabling signal gates the sequential memory means allowing the data messages to be read out of the sequential memory means in the order in which the data messages where input into the sequentially memory. The data messages are output to the peripheral processor via the control and sense decoder means and the sense field.

A BRIEF DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
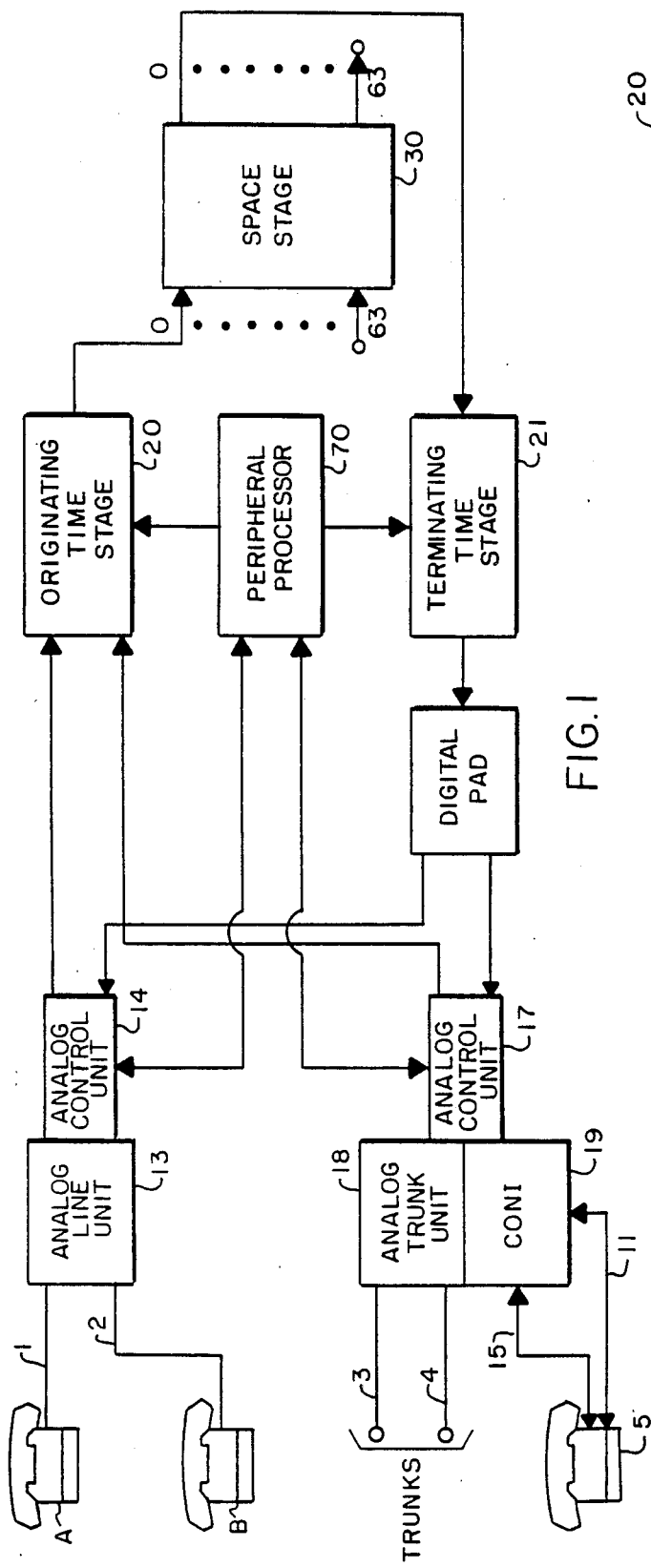
FIG. 1 is block diagram of a CENTREX network system embodying the present invention.

Referring to FIG. 1, a time-space-time digital switching system having a central exchange or CENTREX feature is shown. As a standard central office exchange feature telephone instruments A and B are connected to the network switching system via analog subscriber lines 1 and 2 to an analog line unit 13. The analog data received is converted to Pulse Code Modulated (PCM) digital signals for output to the next network stage. Analog line unit 13 is connected to analog control unit 14. Originating time switch 20 is connected to a space switch unit 30, which in turn is connected to a terminating time switch 21. Terminating time switch 21 is connected to analog control unit 14 and finally back to analog line unit 13 where the PCM digital signals are converted to analog signals and transmitted down lines 1 and 2.

Terminating time switch 20 is further connected to control unit 17, analog trunk unit 18 and trunks 3 and 4. Analog trunk unit 18 can be dedicated exclusively for CENTREX use. The trunk unit 18 connects the CENTREX customers subscriber instruments to the network system.

The Console Interface Circuit (CONI) 19 of the present invention is connected to an analog control unit 17 and provides the means by which system commands, display messages and attendant console keycodes are transferred between the attendant console 5 and the CENTREX network system. The operation of the CONI circuit is transparent to both the system and the attendant console. Communication between CONI 19 and console 5 is via a digital data path 15 and an analog talk path 11.

Figure 2:
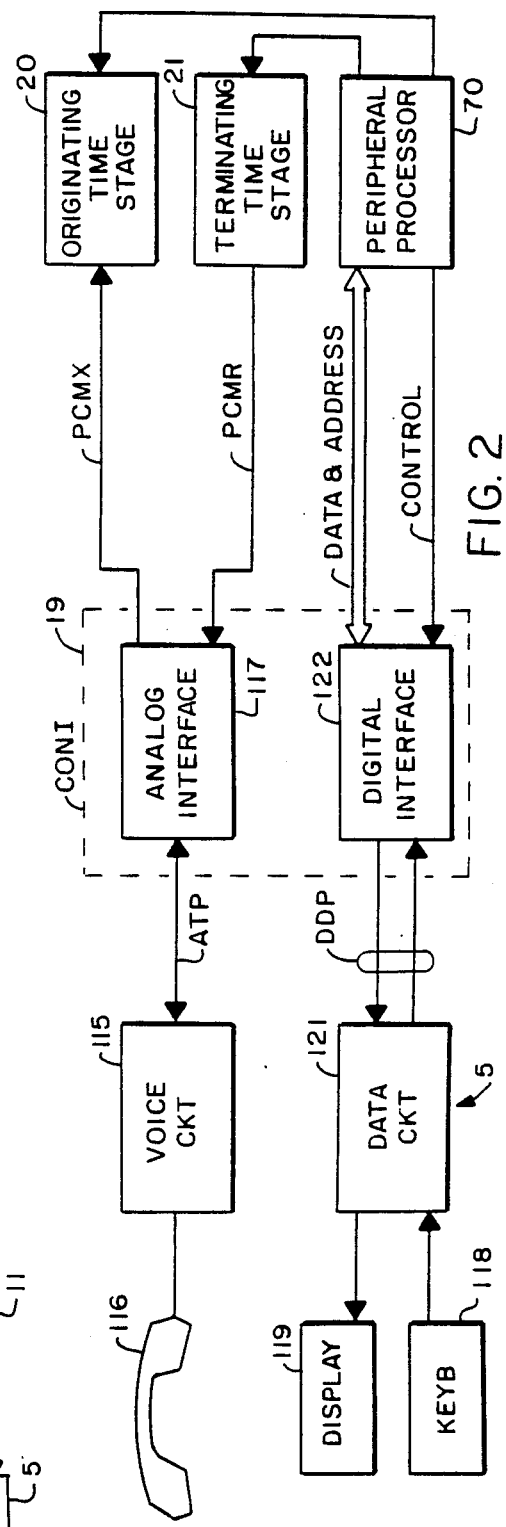
FIG. 2 is block diagram showing the linking paths of the present invention interface the attendant console and the CENTREX network system.

Turning now to FIG. 2, a block diagram illustrating the interface of the attendant console to the CENTREX system is shown. The CONI interfaces the attendant console 5 and CENTREX system via two distinct communication links. In the first link, all analog signals are interfaced from the console handset 116, via voice transmission circuit 116 and analog talk path (ATP) to the analog interface 117 in the CONI 19. The analog signals are converted in the analog interface 117 into pulse code modulated (PCM) signals and transmitted to the originating time stage 20 of the CENTREX network via PCM path PCMX.

Likewise, analog information destined for the attendant console 5, is applied in PCM form to PCM path PCMX from the terminating time stage 21. The PCM information is converted into analog information by the analog interface 117 of CONI 19 and sent to handset 116 through the ATP and voice circuit 115. This communication link forms the talking path between the console 5, the CONI 19 and the network system of the CENTREX.

The data link between the console 5 and the CONI 19 is routed from a keyboard via a console data circuit 121 and a 4 wire full duplex data link (DDL) to the digital interface 122. Data input by the console operator is converted by the data circuit 121 into asynchronous data messages comprising 1 start bit, 7 data bits, an even parity bit and a stop bit. The data messages are transmitted over the DDL via a 1200 baud Frequency Shift Key (FSK) modem located in data circuit 121. The data transmitted by the console is received by the CONI 19 digital interface 122, converted into 8-bit data bytes and is processed by the CONI. The data is passed on to the network via ACU 17 to the peripheral processor 70 if no action is required by the CONI. The CONI thereby assumes a "transparent" front to the CENTREX network system and functions as a transaction exchange medium. Alternatively, in certain cases keycodes and command codes received by the CONI are acted upon and responded to by the CONI.

Data from the peripheral processor 70 in the form of command codes is transmitted to the CONI digital interface 122. Again if the data is destined only for the console the CONI formats the data into FSK asynchronous data messages and transmits the messages over the 1200 baud DDL to the console data circuit 5. The data is interpreted by the console and the appropriate display device 119 activated, i.e. LEDs turn on or off, a message displayed, the display cleared, or an audible alarm turned on or off.

Figure 3:
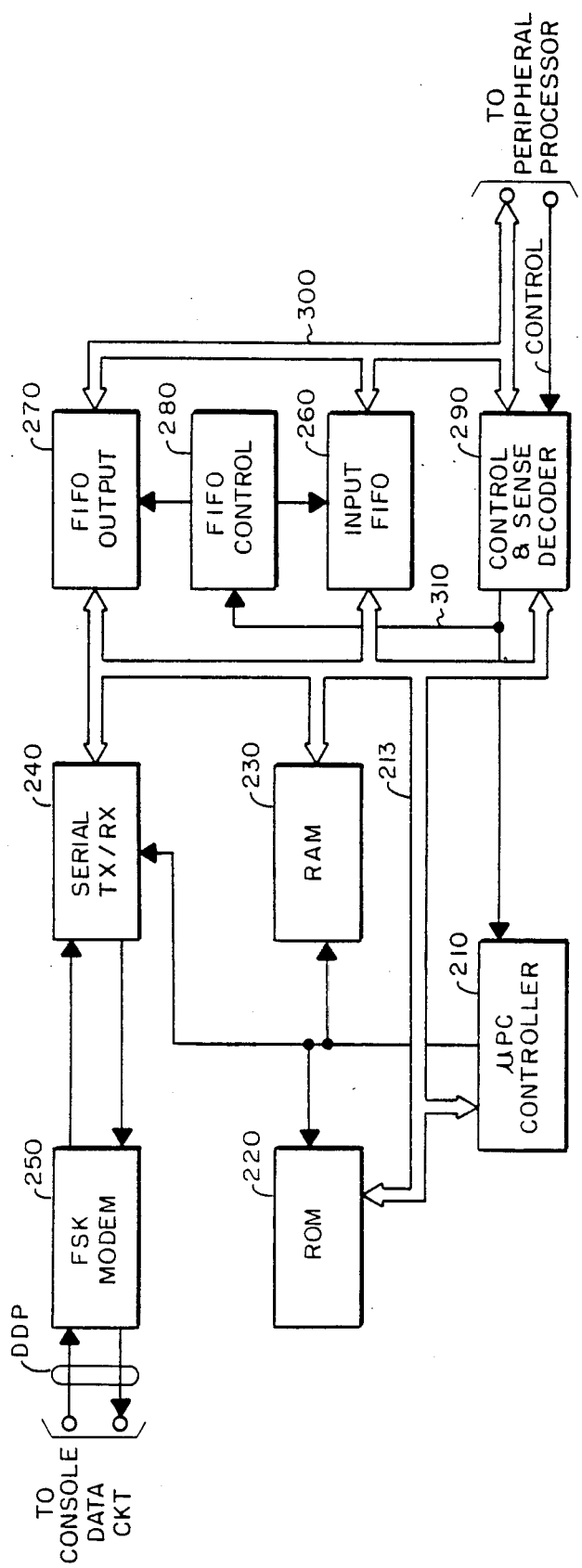
FIG. 3 is a block diagram of the digital line interface of the present invention.

Turning now to FIG. 3, a detailed explanation of the CONI digital interface will be given.

The CONI interface of the present invention is comprised of the following Large Scale Integrated (LSI) devices. A controller portion includes a microprocessor 210 connected to a Read Only Memory (ROM) 220 and Random Access Memory (RAM) 230 through an address/data bus 212. The ROM circuit 220 stores the operating system used by the microprocessor 210 which controls the operation of the CONI interface. The RAM is used as a temporary storage area for the message bytes received by the CONI. This controller portion of the CONI interface is connected to the console 5 via a serial Transmitter/Receiver (Tx/Rx) 240 and a Frequency Shift Key (FSK) modem chip 250.

The serial Tx/Rx is a LSI Universal Serial Asynchronous Receiver Transmitter (USART) such as the Intel 8259. This device under control of the microprocessor translates the 8 data bits sent to the USART on the address/data bus into the asynchronous serial data words described earlier. The FSK modem translates the data into audio tones for the transmission of the data down a twisted pair transmission path DDP.

The connection between the CONI interface and the peripheral processor is accomplished via a pair of 64×4 First In First Out (FIFO) circuits. An input FIFO 260 and an output FIFO 270 each have one side of the FIFOs connected to address/data bus 300 which extends from the peripheral processor. Each FIFO is further connected to the CONI data bus 212. A control and sense decoder 290 is also connected to the peripheral processor address/data bus 300 and CONI address-/data bus 212. The control and sense decoder interprets control words sent by the peripheral processor detailing the type of messages sent to the CONI and any special handling that is required. The control and sense decoder 290 also communicates to the microprocessor and a FIFO control circuit via control lead 310.

As explained earlier and shown on FIG. 2 the CONI also includes an audio interface for transmitting analog voice signals between the console 5 and CENTREX network system and CENTREX network system to the console 5. The analog interface between the console 5 and the CONI consists of a single tip and ring voice pair (T and R). On this analog pair voice conversations and DTMF tones are transmitted. The system provides the talk battery on the tip and ring leads which also powers the DTMF generator in the console. The console 5 contains a standard network interface.

Figure 4:
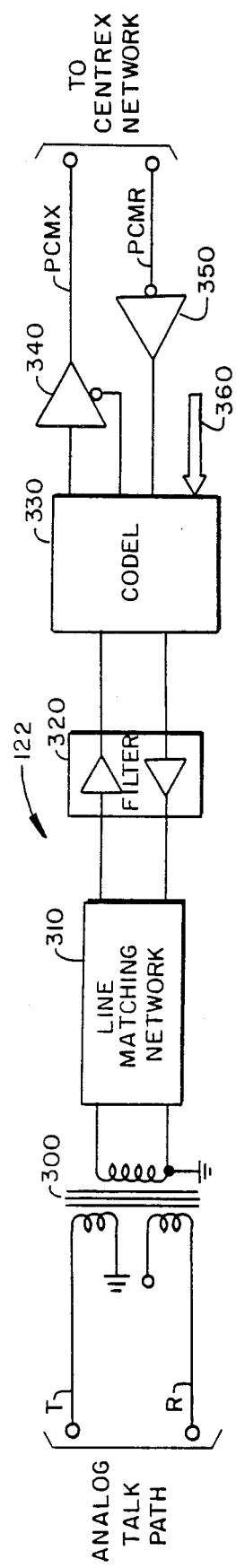
FIG. 4 is a block diagram of the analog line interface.

Turning now to FIG. 4, the analog interface of the CONI is illustrated. The interface 122 includes a two to four wire hybrid coil 300, a line matching network 310 in the form of an electrical hybrid, a transmit and receive amplifier and filter comprised of an INTEL 2912 filter and an INTEL 2910 CODEC (COder/DECoder). The hybrid coil 300 interfaces directly to the line matching network 310. The line matching network includes the necessary components for two balancing networks. This allows the use of −5 volt non-loaded lines or +12 volt loaded lines. The line matching network 310 is connected via lines TX and RX to filter network 320. The TX line connects to a transmit filter in the filter 320 as does the RX line to a receive filter. The filters also have provisions for adding the necessary gain in both the transmit and receive paths. The filter 320 is further connected via lines TX and RX to the CODEC 2910. The output of the transmit filter drives the analog input of CODEC 330. The CODECs primary function is to encode an analog signal into a 8 bit PCM word which is then sent to the network in the proper channel via driver 340 and the PCM transmit bus PCMX.

Similarly, the CODEC 330 will clock in information from the receive PCM bus PCMR and driver 350 during its assigned channel. The binary signal is then decoded into PAM (pulse amplitude modulated) signals by the CODEC and converted into an analog signal by the receive filter of filter 320. The analog signal is then applied to the console via the line matching network and the T and R leads of the hybrid coil 300. Controls signals 360 connected to the peripheral processor allows the CODEC to be programmed to operate in a specific manner i.e. transmit and receive, transmit only or operate within a certain time slot.

It should be noted since the CONI analog interface and digital interface use two distinct communication links to transmit information between the console 5 and the CENTREX network system. The analog talk path and the duplex data path may be used simultaneously in transmission and reception of analog and digital data.

Before a detailed explanation of the CONI circuit is given it is believed an understanding of the message structure transmitted between the console and the CENTREX system will be helpful. The messages that are transmitted between the CONI console 5 and the CENTREX system are in an ASCII field format. All characters including numbers are transmitted as ASCII characters. The field format consists of command and data fields strung together to form a command string. This command string is treated as a single message by the console 5 or the CENTREX system. Command and data fields are separated by a "CARRIAGE RETURN" (CR). A message is terminated by a null field which is in this case a double "CARRIAGE RETURN". There is no set field length, but the maximum message length is 64 characters. Each message from the system is followed by a complementary checksum. A checksum is sent with each keycode message transmitted by console 5. The following are examples of valid command strings:

A 3 field command sent from the system to the console.
 XX:MM:DDDDDDDD::C
A 2 field response sent from the console to the system.
 XX:DDDDDDDD::C
In the above examples:

X=command code or keycode.
M=command code modifier.
D=command code data.
C=checksum.
:="CARRIAGE RETURN" field delimiter.

All command codes, keycodes, modifiers and data are in a 7 bit ASCII format. The checksum is a 2's complement of the entire command message including the carriage return field delimiters.

Normally, the data messages will carry keycodes to the CENTREX system from the console 5 or command codes from the CENTREX system to the console 5. For example, some keycode commands may include keycodes to display time, display all busy trunks, display system alarms and display loop status.

Most of the keycodes including those mentioned above are handled transparently by the CONI. The term "transparent" as used means that the CONI performs only as a transaction exchange medium. However, there are four exceptions to the previous statements where the CONI circuit interprets the keycodes from the console 5 and acts on the information itself.

These exceptions are used for command message acknowledgements by the console 5 and also for fault detection in the data flow between the CONI and the CENTREX system. The four keycodes is as follows:

CARRIER LOSS DETECT—the console sends this keycode upon detecting a loss of incoming carrier from the CONI on the incoming data pair. Upon reception of this keycode the CONI will send an ERROR message to the CENTREX system.

ACKNOWLEDGEMENT—The console 5 sends this keycode to acknowledge a command code message that has been previously sent to it.

NO ACKNOWLEDGE—The console 5 sends this keycode indicating to the CONI that the last command message received did not pass a checksum verification at the console. The CONI will transmit the message again. If the retry is unsuccessful the CONI will send an ERROR message to the CENTREX system.

HARDWARE ERROR—The console 5 sends this keycode when it finds an error in its self-test. The CONI will report the error through an ERROR message to the CENTREX system.

The CONI interface circuit communicates to the console 5 and to the CENTREX network system by accepting information from one end and transferring that information to the other. In order for this to be accomplished in the most expedient manner, the CONI uses a priority structure to decide which action to take. The priority is as follows:

| PRIORITY 1 | highest | console incoming data to CONI |
|---|---|---|
| PRIORITY 2 | | console outgoing data from CONI |
| PRIORITY 3 | | CONI data from the network |
| PRIORITY 4 | lowest | CONI data to the network |

Figure 5:
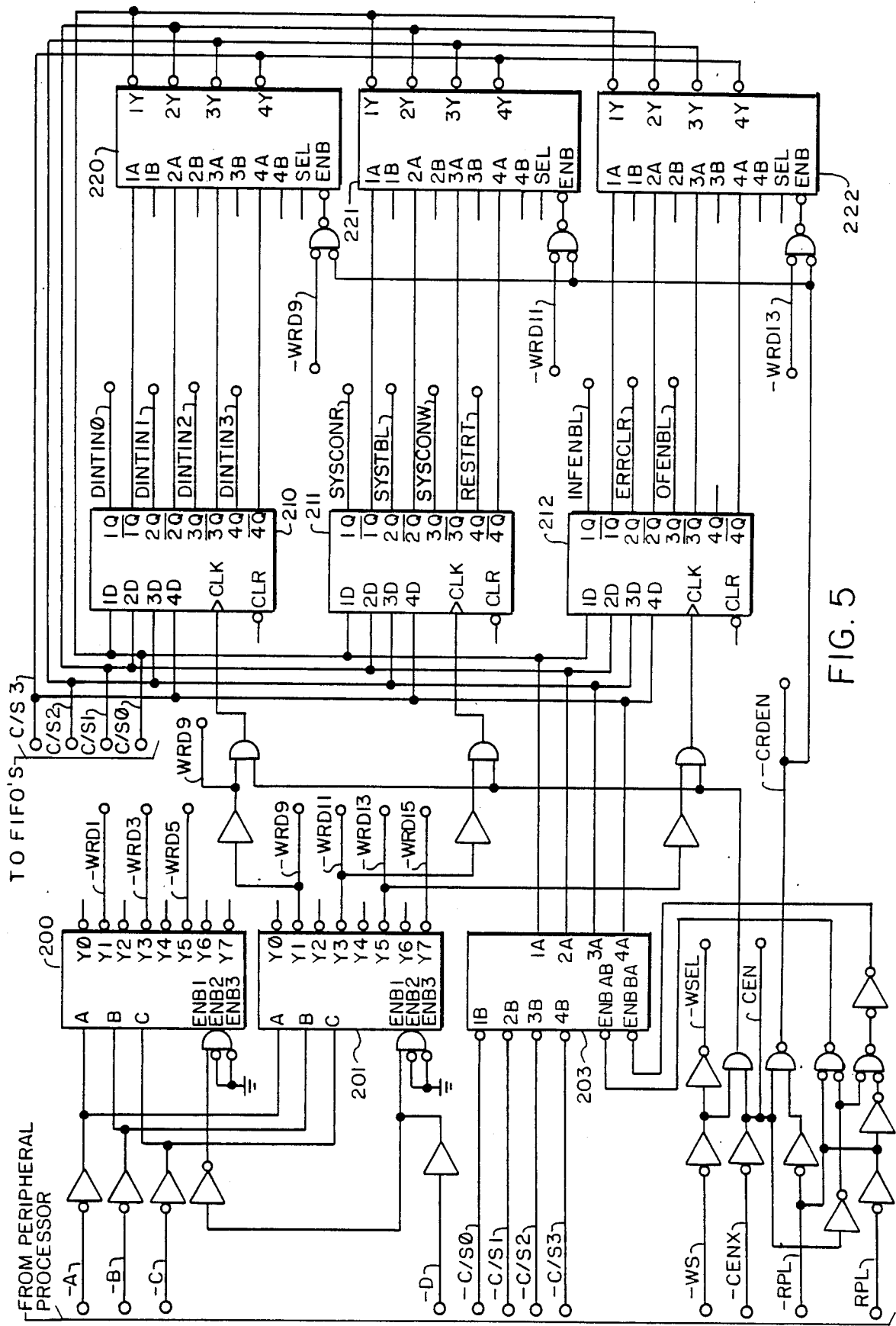
FIG. 5 is a schematic of the control and sense decoder shown in FIG. 3.
Figure 6:
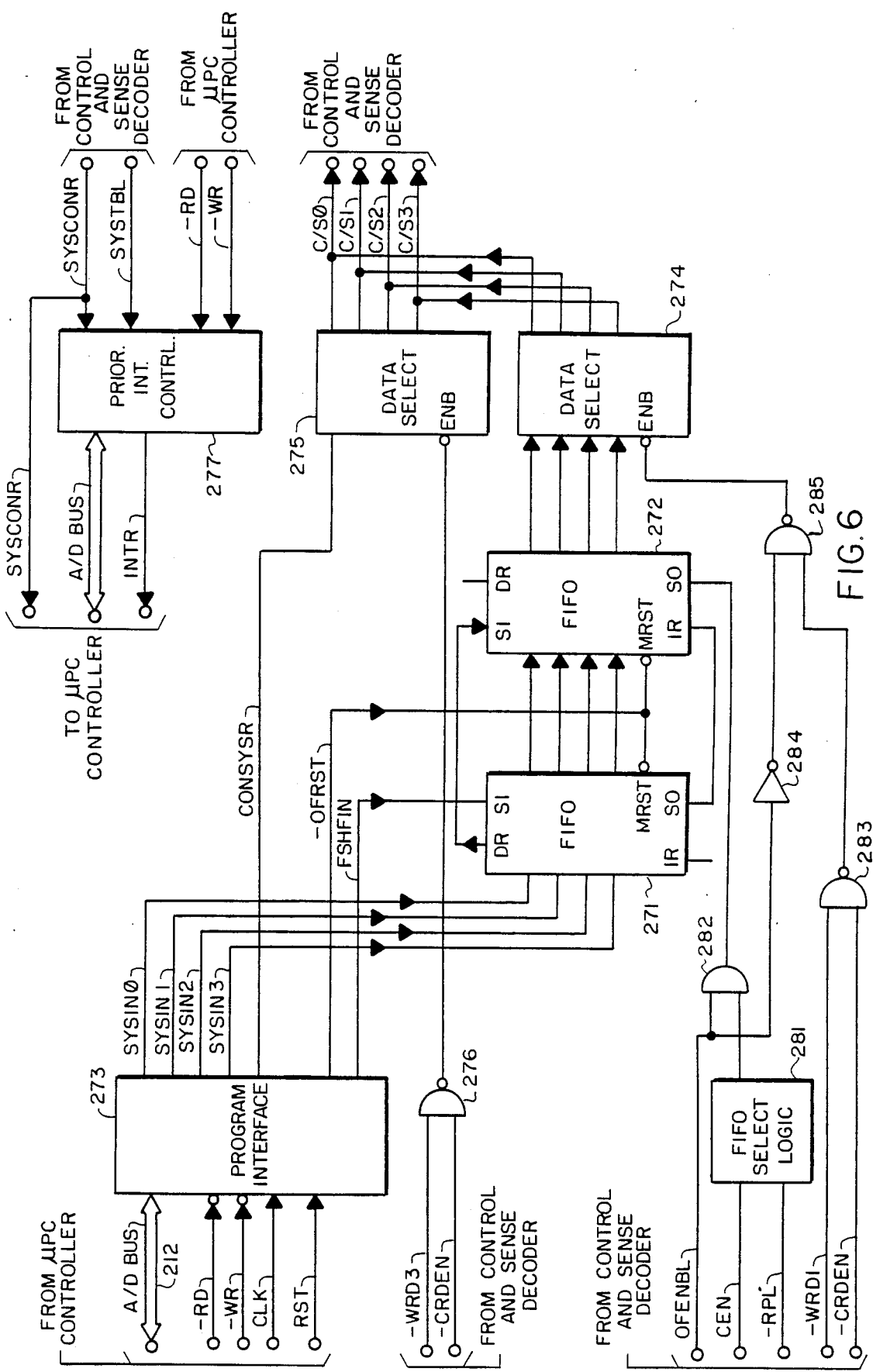
FIG. 6 is a schematic of the output FIFO shown at FIG. 3 as well as its support circuitry.

Turning now to FIGS. 5 and 6, a detailed schematic of the control and sense decoder 290 and the output FIFO 270 and support circuitry respectively is shown.

The control and sense decoder interfaces the CONI and CENTREX peripheral processor. The circuit is comprised of control point decoders 200 and 201, data transceiver 203, flip-flops 210–212 and data selectors 220–222. In addition, a number of logic gates are used to provide decoding of various read, write and enable control signals.

Decoders 201 and 202 have their inputs connected to the analog control unit (ACU) 17 which is connected to the peripheral processor 70. In all cases the CONI communicates to the peripheral processor 70 via a control sense field of ACU 17. Decoder inputs —A——D are address leads which specify the control point or sense point type. For example, a binary "1" (0001) sent to decoders 201 and 202 is interpreted as a WORD 1 control word, setting the decoder 200 output lead labeled WRD1. As can be seen there are 7 output control words and therefore decoders 200, 201 recognize 7 control points. The control words will be identified later in the explanation of the operation of the CONI. The ACU 17 is further connected to the control sense decoder 290 via a bidirectional data control and sense bus leads C/S0-C/S3. Message data as well as other control data such as ERROR words are passed between the CONI and the peripheral processor via this bidirectional bus. Finally, write control signals, —WS, —WSEL, read control signals —RPL, RPL and enabling signals —CENX, CEN are input from ACU 17 and decoded and used to write, read and enable the control words and data being transferred between the CONI and the peripheral processor 70. Finally, the control and sense decoder is connected to the output FIFO circuit 270 via control and sense bus C/S0-C/S3.

Turning now to FIG. 6, the output FIFO circuit 270 of the present invention is shown. The output FIFO circuit is comprised of a pair of 64×4 FIFO circuits 271 and 272 connected in series. FIFO's 271 and 272 have a storage capacity of 128 nibbles. FIFO 271 has its data inputs SYSIN0-SYSIN3 connected to complementary outputs SYSIN0-SYSIN3 of programmable peripheral interface (PPI) 273. PPI 273 also has a number of output leads which are used in various control and handshaking functions and which will be explained later. The PPI 273 is connected to the CONI address/data bus 212 as well as various read, write and reset control signals extending from the microprocessor 210. Data messages for transmission to the CENTREX system are sent to the output FIFO's 271, 272 via bus 212 and out of the FIFO's via bus field C/S0-C/S3 and data selector 274. A priority interrupt controller (PIC) 277 is provided for signaling the microprocessor when the peripheral processor 70 is reading the output FIFO's. PPI 273 as well as PIC 277 are well known microcomputer peripheral devices such as those manufactured and sold by the INTEL CORPORATION as devices 8255A and 8259A respectively.

With renewed reference to FIGS. 5 and 6, an explanation of a data message transfer between the CONI and CENTREX system will now be given. A keycode message is transmitted from console 5 over the DDP path to the CONI. It is received by FSK modem 250 and sent to the serial TX/RX 240 where the serial data is converted into 8-bit bytes and stored in RAM 230. The received keycode message is analyzed by microprocessor 210 and ascertained if it is a keycode which the CONI should pass on or act on. The CONI will then verify via the recomputed checksum if the message is valid. After 5 invalid messages the CONI will send an error code to the ACU 17 via the ERROR (WRD5) field. If the checksum shows that the received message is valid the CONI will clear the output FIFO's 271 and 272. The FIFO's are cleared by a RST signal sent from the microprocessor to PPI 273. PPI outputs signal —OFRST to the MRST inputs of FIFO's 271 and 272. The microprocessor than initiates the transfer of the received message byte from RAM 230 4-bits (nibble) at a time with the most significant nibble first via bus 212 to PPI 273. Signal FSHFIN connected to the FIFO's serial in (SI) input is set allowing PPI 273 to output the data nibbles to FIFO 271.

After shifting in the complete data message the CONI will set signal CONSYSR which is output from PPI 273 to data selector 275. Data selector 275 is enabled by NAND gate 276 when control word —WRD3 and enable signal CRDEN are set. The CONSYSR signal is interpreted by the peripheral processor 70 and responds by setting OFENBL and SYSCONR. Signal SYSCONR is developed from control word 11 and output from decoder 201 to flip-flop 211 as signal —WRD11. SYSCONR is then applied to PIC 277 and to microprocessor 210 signaling the microprocessor that the peripheral processor is reading the output FIFO 270. Concurrently, control word 13 OFENBL is decoded by decoder 201 and shifted into flip-flop 212 from the —WRD13 output of decoder 201. A serial output enabling signal is developed by AND gate 282 from FIFO select logic 281 and the setting of OFENBL. The signal is applied to the SERIAL output (SO) of FIFO 272 gating the shifting out of the data message stored in the FIFOS. The output data message nibbles are input to data selector 274. Data selector 274 is enabled by logic gates 283, 284 and 285 and input signals OFENBL and —WRD1 (DINTOUT) and —CRDEN. The data message is finally output via bus field C/S0-C/S3 to ACU 17 and the peripheral processor 70.

When the complete message has been read the peripheral processor resets SYSCONR and OFENBL and CONI responds by resetting CONSYSR.

In the event that an error has occurred during the read, the peripheral processor will set SYSTBL by sending control word 11 to decoder 201. SYSTBL is then output from flip-flop 211 and input by PIC 277 where an interrupt signal INTR is sent to microprocessor 210. The microprocessor then resets CONSYSR whereby, the message is reloaded into the FIFO's 271 and 272 once more. The CONI then resets CONSYSR and peripheral processor resets SYSTBL and begins the transfer operation again. The CENTREX software determines how many error transactions to allow before taking any recovery action.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An interface circuit for transmitting data messages between a remotely located attendant console and CENTREX equipped central office exchange, said central office exchange including an analog control unit connected to a peripheral processor, said analog control unit including a control field for sending control signals to said interface circuit and a sense field for receiving control signals and data messages from said interface circuit, said interface circuit comprising:

control and sense decoding means connected to said control and sense fields arranged to output control signals to said interface circuit in response to control commands sent over said control field and output control signals and data messages over said sense field;

receiving means connected to said attendant console arranged to receive data messages from said attendant console;

controller means connected to said receiving means, said controller means arranged to process said received data messages storing said data messages in a temporary memory, said controller means further connected to said control and sense decoding means and arranged to output control signals to said peripheral processor;

sequential memory means connected to said temporary memory for receiving and storing in sequential order as received said data messages, said sequential memory means further including memory enabling means connected to said control and sense decoding means; and responsive to said controller means signaling said peripheral processor that data messages have been loaded in said sequential memory means, said peripheral processor sends an enabling signal to said memory enabling means whereby, said data messages are read out of said sequential memory means in the order in which said data messages where input into said sequentially memory and output to said peripheral processor via said control and sense decoder means and said sense field.

2. The interface circuit as claimed in claim 1, wherein: said control and sense decoder means comprises a control and sense decoder circuit including a pair of decoders having their inputs connected to said control field, each of said decoders including a plurality of outputs with each output individually enabled by a specific control signal received by both decoders over said control field.

3. The interface circuit as claimed in claim 2, wherein: said control and sense decoder circuit further includes a plurality of flip-flop circuits each of said flip-flop circuits including a plurality of inputs connected to said sense field and each flip-flop circuit including a clock input connected to a specific one of said pair of decoder outputs whereby, control signals applied to said sense field by said peripheral processor are clocked into and captured by one of said flip-flop circuits response to a control signal sent by said peripheral processor on said control field.

4. The interface circuit as claimed in claim 3, wherein: each flip-flop circuit further includes a plurality of outputs, each flip-flop circuit output sends a control signal indicative of the control signal input by said flip-flop circuits.

5. The interface circuit as claimed in claim 1, wherein: said receiving means comprises a Frequency Shift Key (FSK) modem device and a Universal Serial Asynchronous Receiver Transmitter (USART) devise connected to said FSK modem, said USART arranged to receive data messages in serial form transmitted to said interface device from said attendant console and to signal said controller means that a byte of data is available for processing by said controller means whereby, responsive to an acknowledgement from said controller means said USART transfers said received byte in parallel form to said controller means.

6. The interface circuit as claimed in claim 1, wherein: said controller means comprises a microprocessor controller for controlling said interface circuit and processing said data messages, said microprocessor controller connected to said receiving means and arranged to input and process said data messages by checking for a checksum in each received data message, and additionally to analyze said data message to ascertain if said data message is for said interface circuit or for said peripheral processor.

7. The interface circuit as claimed in claim 6, wherein: in the event said data message is for said interface circuit said microprocessor replies to said data message by sending a data message to said attendant console.

8. The interface circuit as claimed in claim 6, wherein: in the event said data message is for the interface circuit said microprocessor replies to said data message by sending error signals to said peripheral processor via said control and sense decoding means and said sense field.

9. The interface circuit as claimed in claim 6, wherein: said temporary memory is a Random Access Memory (RAM) device and said RAM and said microprocessor controller are further connected to a programmable I/O port, said data messages for said peripheral processor are output from said RAM when all data messages are received from said attendant console to said programmable I/O port a nibble (4 bits) at a time with the most significant nibble first whereby, said data message nibbles are transferred from said programmable I/O port to said sequential memory means one nibble at a time and loaded into said sequential memory in the order received from said attendant console.

10. The interface circuit as claimed in claim 9, wherein: said programmable I/O port is connected to said control and sense decoder and to said sense field and said microprocessor controller transmits a control signal via said programmable I/O port to said peripheral processor signaling that data messages have been loaded into said sequential memory means.

11. The interface circuit as claimed in claim 10, wherein: interface circuit further includes a Priority Interrupt Controller (PIC) connected to said control and sense decoder and to said microprocessor controller whereby, said peripheral processor sends an acknowledgement to said microprocessor controller via said control and sense fields to said PIC which interrupts the microprocessor signaling that the peripheral processor is reading said sequential memory.

12. The interface circuit as claimed in claim 1, wherein: said sequential memory comprises a pair of First In First Out (FIFO) devices connected in series, said FIFO devices are enabled to be written to by a control signal from said controller means.

13. The interface circuit as claimed in claim 12, wherein: said memory enabling means is a 2 input AND gate which outputs a positive logic signal to said shift out input of said FIFO devices responsive to a positive logic signal from a FIFO select logic circuit and said enabling signal from said peripheral processor.

14. The interface circuit as claimed in claim 13, wherein: responsive to said positive logic signal applied to said shift out input of said FIFO devices said data messages stored in said FIFO devices are transferred a nibble at a time to said control and sense decoder over said sense field to said peripheral processor.

* * * * *